US011891962B1

(12) United States Patent
Singh et al.

(10) Patent No.: US 11,891,962 B1
(45) Date of Patent: Feb. 6, 2024

(54) GASEOUS FUEL ENGINE SYSTEM OPERATING STRATEGY INCLUDING HYDROGEN FUELING AMOUNT BASED ON PERFORMANCE TARGET

(71) Applicant: Caterpillar Inc., Peoria, IL (US)

(72) Inventors: Jaswinder Singh, Dunlap, IL (US); David Todd Montgomery, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/895,549

(22) Filed: Aug. 25, 2022

(51) Int. Cl.
*F02D 19/06* (2006.01)
*F02D 19/08* (2006.01)
*F02D 19/02* (2006.01)

(52) U.S. Cl.
CPC ....... *F02D 19/0615* (2013.01); *F02D 19/021* (2013.01); *F02D 19/0642* (2013.01); *F02D 19/0644* (2013.01); *F02D 19/0647* (2013.01); *F02D 19/081* (2013.01)

(58) Field of Classification Search
CPC ............. F02D 19/0642; F02D 19/0644; F02D 19/0647
USPC ......................................................... 123/575
See application file for complete search history.

(56) References Cited

U.S. PATENT DOCUMENTS

| | | | |
|---|---|---|---|
| 5,293,857 A | 3/1994 | Meyer | |
| 5,445,019 A | 8/1995 | Glidewell et al. | |
| 5,666,923 A | 9/1997 | Collier, Jr. et al. | |
| 6,964,261 B2 | 11/2005 | Warne et al. | |
| 7,111,452 B2 | 9/2006 | Miyoshi et al. | |
| 7,290,504 B2 | 11/2007 | Lange | |
| 7,316,218 B2 | 1/2008 | Yasushi | |
| 8,118,012 B2 | 2/2012 | Suzuki et al. | |
| 8,301,359 B1* | 10/2012 | Sagar | G05B 19/042 123/1 A |
| 8,702,916 B2 | 4/2014 | McBride et al. | |
| 8,820,293 B1* | 9/2014 | McAlister | F02P 23/04 123/297 |
| 9,593,629 B2 | 3/2017 | Rasmussen et al. | |
| 9,790,883 B2 | 10/2017 | Rebinsky | |
| 9,932,910 B2 | 4/2018 | Hunter | |
| 10,041,432 B2 | 8/2018 | Puckett et al. | |
| 10,260,446 B2 | 4/2019 | Ottikkuti et al. | |
| 10,760,480 B2 | 9/2020 | Malm et al. | |
| 10,876,491 B1 | 12/2020 | Claude et al. | |
| 11,619,183 B1* | 4/2023 | Lavertu | F02D 19/0605 701/103 |

(Continued)

FOREIGN PATENT DOCUMENTS

| | | |
|---|---|---|
| EP | 2453124 A1 | 5/2012 |
| FR | 3083268 B1 | 11/2020 |
| JP | 2003148187 A | 5/2003 |

*Primary Examiner* — Erick R Solis
(74) *Attorney, Agent, or Firm* — Brannon Sowers & Cracraft PC

(57) ABSTRACT

Operating a gaseous fuel engine system includes outputting control commands to a first fuel admission valve and a second fuel admission valve to admit, respectively, a gaseous fuel blend containing a gaseous hydrogen fuel (H2), and additional H2, into a gaseous fuel engine. An amount of the additional H2 is determined by way of the respective control command based on a performance target for an engine parameter varying on the basis of a relative amount of H2 in a combustion charge. Related apparatus and control logic is also disclosed.

20 Claims, 2 Drawing Sheets

(56) References Cited

U.S. PATENT DOCUMENTS

| | | | |
|---|---|---|---|
| 2007/0181083 A1* | 8/2007 | Fulton | G06Q 30/0225 |
| | | | 123/3 |
| 2009/0188449 A1* | 7/2009 | Fawcett | F23C 1/12 |
| | | | 123/3 |
| 2010/0180838 A1 | 7/2010 | Lewis, III et al. | |
| 2011/0166769 A1* | 7/2011 | Buechler | F02M 21/0239 |
| | | | 701/103 |
| 2012/0037098 A1* | 2/2012 | Wey | F02B 51/06 |
| | | | 123/3 |
| 2012/0160221 A1* | 6/2012 | Munshi | F02M 21/0206 |
| | | | 123/575 |
| 2014/0290595 A1* | 10/2014 | Owens | C25B 15/02 |
| | | | 123/3 |
| 2015/0006849 A1 | 3/2015 | Robart | |
| 2015/0037716 A1 | 12/2015 | Smith et al. | |
| 2016/0108862 A1* | 4/2016 | Siuchta | F02M 26/20 |
| | | | 123/568.14 |
| 2021/0087981 A1* | 3/2021 | Wang | F02D 41/0027 |

* cited by examiner

GASEOUS FUEL ENGINE SYSTEM OPERATING STRATEGY INCLUDING HYDROGEN FUELING AMOUNT BASED ON PERFORMANCE TARGET

STATEMENT OF GOVERNMENT INTEREST

This invention was made with government support under Contract No. DE0009422 awarded by the Department of Energy. The government has certain rights in this invention.

TECHNICAL FIELD

The present disclosure relates generally to operating a gaseous fuel internal combustion engine system, and more particularly to determining an amount of additional gaseous hydrogen fuel (H2) to be admitted into the engine to supplement H2 in a gaseous fuel blend.

BACKGROUND

Gaseous fuel engines are used throughout the world for a range of purposes including vehicle propulsion, operation of pumps and compressors, and electrical power generation to name a few examples. Gaseous fuels used in such engines have traditionally included gaseous hydrocarbon fuels such as natural gas. Such fuels tend to produce fewer emissions of certain types relative to liquid hydrocarbon and similar fuels and are generally widely available. A typical engine arrangement includes an apparatus for feeding gaseous fuel into an intake system of the engine, or in some instances directly injecting it, into cylinders where the fuel is ignited to produce a controlled combustion reaction driving pistons to rotate a crankshaft. Many different engine configurations and operating regimes have been proposed over many years.

Research efforts more recently have focused on the exploitation of various alternative fuels, including gaseous hydrogen fuels. Hydrogen combustion tends to produce few undesirable emissions, and notably substantially zero so-called greenhouse gas or GHG emissions. Using hydrogen as a fuel in reciprocating engines nevertheless has proven challenging. Hydrogen tends to be less energy dense than traditional hydrocarbon fuels, has a faster flame speed, and may require specialized storage and handling.

Various research efforts have also sought to combine hydrogen with other fuels for combustion. Many engines are purpose-built to a certain fuel type or range of fuel types. The engine configuration and hardware arrangement itself may be highly specialized for natural gas as compared to diesel, for example. Moreover, engine control strategies for operating on one type of fuel may be poorly suited to different fuel types. One example engine potentially operating on hydrogen or various blends is set forth in co-pending and commonly owned U.S. patent application Ser. No. 17/673,517 to Cress, filed Feb. 16, 2022. The art provides ample opportunity for improvements and alternative strategies.

SUMMARY

In one aspect, a method of operating a gaseous fuel internal combustion engine system includes outputting a first control command to a first fuel admission valve to admit a gaseous fuel blend containing a gaseous hydrogen fuel (H2) from a first gaseous fuel supply into a gaseous fuel engine, and outputting a second control command to a second fuel admission valve to admit additional H2 from a second gaseous fuel supply into the gaseous fuel engine. The method further includes forming a combustion charge in a cylinder in the engine from the gaseous fuel blend, the additional H2, and air. The method still further includes determining, by way of the second control command, an amount of the additional H2 based on a performance target for an engine parameter varying on the basis of a relative amount of H2 in the combustion charge. The method still further includes burning the combustion charge in the cylinder.

In another aspect, a gaseous fuel engine system includes a gaseous fuel engine having a cylinder formed therein, and a conduit structured to convey a gaseous fuel blend containing a gaseous hydrogen fuel (H2) to the cylinder, and a fuel system. The fuel system includes a fuel admission valve, and a fueling control unit structured to output a control command to the fuel admission valve to deliver additional H2 supplementing the H2 in the gaseous fuel blend, and to determine the control command to form within the cylinder a combustion charge of the gaseous fuel blend, the additional H2, and air, having a relative amount of H2 that is based on a performance target of an engine operating parameter that varies on the basis of a relative amount of H2 combusted in the cylinder. The fueling control unit is further structured to operate the gaseous fuel engine in satisfaction of the performance target.

In still another aspect, a fueling control system for a gaseous fuel engine system includes a computer readable memory storing an engine performance model populated based on an engine operating parameter that varies on the basis of a relative amount of a gaseous hydrogen fuel (H2) combusted in a cylinder in a gaseous fuel engine. The fueling control system further includes a fuel control unit coupled to the computer readable memory and structured to output a control command to a fuel admission valve to deliver additional H2 supplementing H2 in a gaseous fuel blend conveyed into the cylinder. The fueling control unit is still further structured to determine a control command by way of the engine performance model to form within the cylinder a combustion charge of the gaseous fuel, the additional H2, and air, having a relative amount of H2 that is based on a performance target of the engine operating parameter.

DETAILED DESCRIPTION

Figure 1:
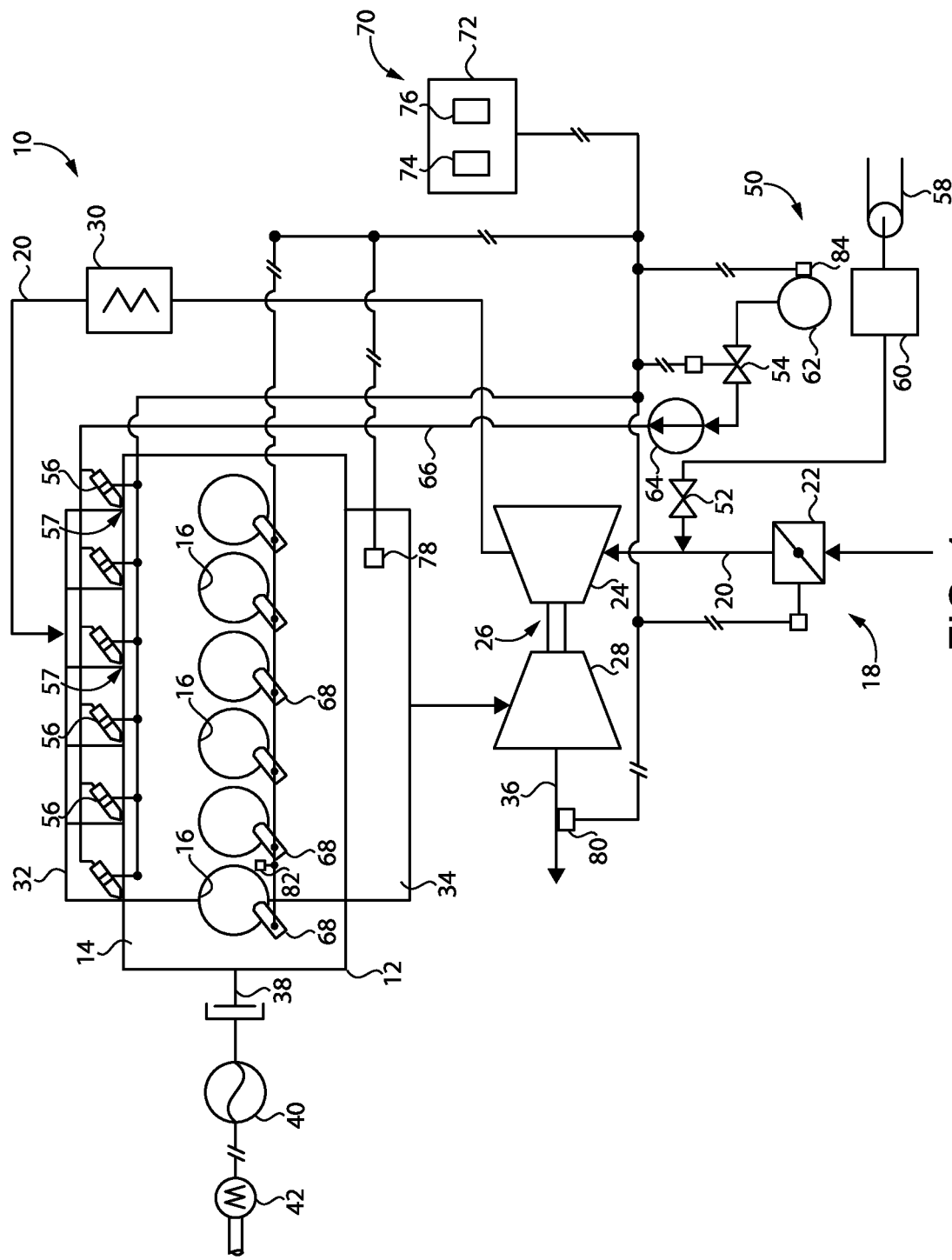
FIG. 1 is a diagrammatic view of a gaseous fuel engine system, according to one embodiment.

Referring to FIG. 1, there is shown a gaseous fuel internal combustion engine system 10, according to one embodiment. Engine system 10 includes a reciprocating gaseous fuel engine 12 having an engine housing 14 with a plurality of cylinders 16 formed therein. Pistons will be positioned within cylinders 16 and operable to move between a bottom-dead-center position and a top-dead-center position, typically in a conventional four-stroke engine cycle. Cylinders 16 can include any number, in any suitable arrangement such as an in-line pattern, a V-pattern, or still another. Cylinders 16 are referred to hereinafter, at times, in the singular. Engine 12 also includes a driveshaft 38 rotatable based upon the movement of pistons in cylinders 16 to rotate a load 40. Load 40 may include an electrical generator coupled to an electrical device such as a motor 42. An electrical generator operated by engine 12 could also be used to supply electrical power to a local or a regional electrical grid in some embodiments. In still other embodiments engine system 10 could be implemented for vehicle propulsion, operation of a pump or a compressor, or for various other purposes.

Engine system 10 also includes an intake system 18 having an intake conduit 20 structured to convey a gaseous fuel blend containing a gaseous hydrogen fuel (H2) to cylinders 16. Intake system 18 may also include an air:fuel ratio (AFR) valve 22 or other intake airflow control element that can be varied in position to adjust airflow into intake conduit 20 to vary an AFR of engine 12 according to generally known principles. Intake system 18 also includes a compressor 24 positioned at least partially in intake conduit 20 and coupled to a turbine 28 in a turbocharger 26. Turbine 28 rotates in response to a flow of exhaust from engine 12 to rotate compressor 24 to pressurize intake air to be supplied to engine 12 through intake conduit 20 via an aftercooler 30. Intake system 18 also includes an intake manifold 32 attached to engine housing 12. A plurality of intake ports 57 fluidly connect between intake manifold 32 and each respective cylinder 16. An exhaust manifold 34 is also attached to engine housing 14 and conveys exhaust to an outgoing exhaust conduit 36 to be passed through turbine 28.

Engine system 10 also includes a fuel system 50. Fuel system 50 includes a first fuel admission valve 52. In the illustrated embodiment first fuel admission valve 52 includes a fumigation admission valve for fumigation delivery of a gaseous fuel blend coupled to intake conduit 20 at a location upstream of compressor 24. Fuel system 50 also includes a second fuel admission valve 56. In the illustrated embodiment a plurality of fuel admission valves 56 are provided, hereinafter referred to at times in the singular, and each configured as a port injection admission valve at a respective location of one of intake ports 57. In other embodiments each respective second fuel admission valve 56 may be a direct injection admission valve positioned to extend into a respective cylinder 16. Yet another fuel admission valve is shown at 54.

Fuel system 50 includes a first fuel supply 58 structured to supply a gaseous fuel blend to intake conduit 20 by way of fuel admission valve 52 after passing through a filter 60 or other processing equipment. In an embodiment fuel supply 58 may be a line gas supply providing a blend of a gaseous hydrocarbon fuel (HC) such as natural gas, methane, ethane, and a gaseous hydrogen fuel (H2) such as gaseous molecular hydrogen. A line gas supply as contemplated herein could supply mine gas, landfill gas, biogas, dynamically blended H2 and HC from a hydrogen reformer and a natural gas pipeline, or still others. Fuel system 50 also includes a second fuel supply 62. Second fuel supply 62 may contain pressurized H2 or blends thereof, and is structured to supply the H2 by way of admission valve 54 to a pump 64. Pump 64 can further pressurize H2 and supply the same by way of a fuel conduit 66 to each respective fuel admission valve or port injector 56. It should be appreciated that the terms "first," "second," "another" and like terms are used herein for descriptive convenience and do not require any particular identity or ordering of elements.

In view of the foregoing description, it will be appreciated that a gaseous fuel blend containing H2 and HC may be supplied from fuel supply 58 for fumigation admission into intake conduit 20 via fuel admission valve 52. H2, or potentially another gaseous fuel blend that contains H2, can be supplied by way of fuel admission valve 54 and fuel admission valves 56 to cylinders 16. As will be further apparent from the following description, engine system 10 is uniquely configured to operate gaseous fuel engine 12 in satisfaction of one or more performance targets, particularly where a ratio of H2:HC being supplied to engine 12 is varied such as by increasing or decreasing H2 concentration relative to HC in a combustion charge combusted in cylinders 16.

Engine system 10 further includes a plurality of sparkplugs 68 each associated with one respective cylinder 16. Sparkplugs 16 can include prechamber sparkplugs having a prechamber supplied with fuel and air from a main combustion chamber (cylinder 16) during a piston compression stroke, open sparkplugs, or potentially prechamber ignition devices having a prechamber supplied with fuel via a dedicated fuel conduit extending to each respective device. Those skilled in the art will be familiar with the operation of prechamber sparkplugs, prechamber ignition devices, and various other spark-ignition devices that employ an electrical spark at a spark gap to ignite an ignition charge producing hot jets of combusting fuel that ignite a larger main charge in a cylinder.

Engine system 10 also includes a fuel control system 70. Fuel control system 70 includes an electronic fueling control unit 72 having a processor 74 such as a microprocessor or a microcontroller, and a computer readable memory 76 that is part of or otherwise coupled to fueling control unit 72. Computer readable memory 76 can include any suitable volatile or non-volatile computer readable memory such as RAM, ROM, SDRAM, EEPROM, FLASH, a hard drive, or still another. Fuel control system 70 may also include a plurality of sensors each structured to monitor different engine operating parameters, and in the illustrated embodiment including an engine sensor 78 that monitors an operating parameter of engine 12 that is indicative of or can be used in determining, inferring, or estimating an engine load. Engine sensor 78 may include an engine speed sensor, a mass airflow sensor positioned in intake system 18, or still another. Those skilled in the art will be familiar with various non-virtual and virtual sensor strategies for determining, inferring, or estimating engine load. Control system 70 may also include one or more exhaust sensors 80. In one embodiment, exhaust sensor 80 includes an exhaust temperature sensor. In another embodiment, exhaust sensor 80 includes a NOx sensor. Embodiments may include both an exhaust temperature sensor and a NOx sensor. Control system 70 may also include a combustion sensor 82. Combustion sensor 82 may be an in-cylinder sensor such as an in-cylinder pressure sensor exposed to a fluid pressure of one of cylinders 16 to monitor a combustion parameter such as in-cylinder pressure that is indicative of combustion phasing. Each of cylinders 16 may be equipped with a combustion sensor in some embodiments. Fuel supply 62 may be a pressurized storage tank containing gaseous molecular hydrogen. Control system 70 may also include a tank level sensor 84 that monitors a tank level or a relative tank level of fuel supply 62.

Computer readable memory 76 may store an engine performance model populated based on one or more engine operating parameters that vary on the basis of a relative amount of H2 combusted in cylinders 16. Fueling control unit 74 is coupled to computer readable memory 76, and structured to output control commands to fuel admission valves 52 and 56, and as appropriate fuel admission valve 54, to admit desired amounts of the fuels from first fuel supply 58 and second fuel supply 62. Fueling control unit 72 may be further structured to output a first control command to fuel admission valve 52 to admit a gaseous fuel blend, at least at times containing H2, from gaseous fuel supply 58 into intake conduit 20 and engine 12. Fueling control unit 72 may be further structured to output a control command to each respective fuel admission valve 56 to deliver additional H2 supplementing the H2 in the gaseous fuel blend admitted by way of fuel admission valve 52. Fueling control unit 72 may be further structured to determine the control command to fuel admission valve 52 by way of the stored engine performance model to form within cylinders 16 a combustion charge of the gaseous fuel blend, the additional H2, and pressurized air, having a relative amount of H2 that is based on a performance target of the engine operating parameter. Fueling control unit 72 is still further structured to operate gaseous fuel engine 12 in satisfaction of the performance target.

A variety of engine operating parameters can be understood to vary on the basis of a relative amount of H2 combusted in cylinders 16. In an embodiment, an engine operating parameter varying on the basis of the relative amount of H2 combusted in cylinders 16 can include a parameter relating directly to engine power output such as break mean effective pressure or BMEP, an efficiency factor such as break thermal efficiency or BTE, an emissions factor such as NOx amount produced, a temperature factor such as exhaust temperature, or still others. These or other engine parameters can tend to vary as H2 concentration in a total amount of fuel combusted varies. The present disclosure can be understood as determining control commands to fuel admission valves 56 to admit an appropriate amount of additional H2 supplementing H2 supplied via fuel admission valve 52 to satisfy a performance target of one or more of the engine operating parameters.

For instance, where a performance target for BMEP is to be satisfied, an amount of additional H2 that is admitted can be appropriate for obtaining a desired BMEP. Directionally, where H2 concentration in a gaseous fuel blend of H2 and HC increases, the lower energy content of H2 versus HC could result in a reduction to BMEP absent supplementing of additional H2 by way of fuel admission valves 56. Where H2 concentration in a gaseous fuel blend of H2 and HC decreases the relatively higher concentration of HC might justify less, or zero, supplementing of H2 by way of fuel admission valves 56 to satisfy a performance target for BMEP. In the case of a performance target for NOx, since combusting H2 produces little or no NOx itself, additional H2 can be admitted by way of fuel admission valves 56 to maintain NOx production of engine system 10 below a desired NOx output limit. Another emissions performance target could include greenhouse gas or GHG emissions. Analogously, other factors such as BTE, exhaust temperature, et cetera, can have specified performance targets or performance target ranges that are satisfied by admitting an appropriate amount of additional H2. It will also be appreciated that fueling control unit 72 may determine fueling control commands in conjunction with other commands to vary engine operation, airflow, fueling, and potentially other factors as further discussed herein. Further, the engine performance model may be populated with multiple performance targets for multiple engine operating parameters and continually adjust an additional amount of H2 that is admitted by way of fuel admission valves 56 to operate engine system 10 as desired.

Figure 2:
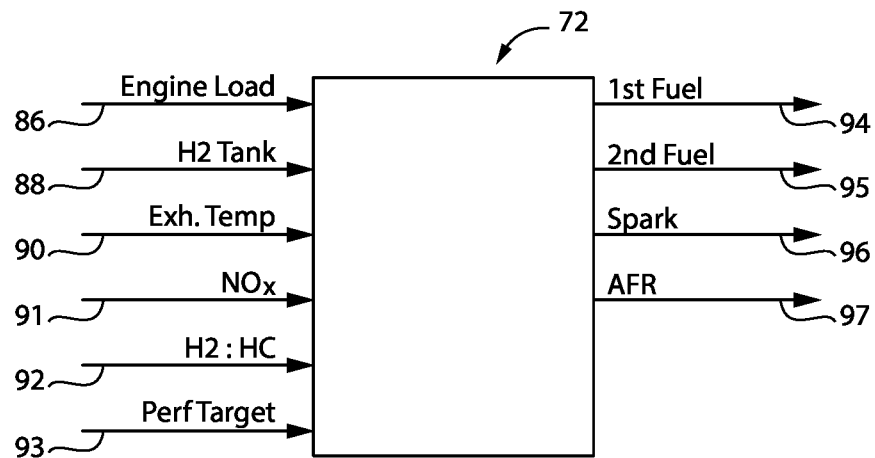
FIG. 2 is a functional block diagram of a fueling control unit, according to one embodiment.

Fueling control unit 72 may be further structured to determine an in-cylinder combustion parameter by way of the stored engine performance model. The in-cylinder combustion parameter may include a spark-timing parameter or an AFR parameter, for example. Accordingly, fueling control unit 72 can output a spark-timing command or an AFR command based on the engine performance model. Referring also now to FIG. 2, there is shown a functional block diagram of fueling control unit 72 illustrating various engine operating parameter inputs and control command outputs determined on the basis of a stored engine performance model. In FIG. 2, fueling control unit 72 is shown receiving an engine load input 86, an H2 tank level input 88, an exhaust temperature input 90, a NOx emissions level input 91, and an H2:HC ratio input 92. Inputs 86, 88, 90, 91 can be understood as monitored engine operating parameters varying on the basis of a relative amount of H2 combusted in cylinder 16. Fueling control unit 72 may also receive input 92 indicating H2:HC ratio in real time, and a selectable or user-determinable performance target input 93. In an embodiment, performance target 93 may be a BMEP level, a BTE level, a NOx level, a GHG level, an exhaust temperature level, et cetera. Performance targets can vary depending upon operator preference or external efficiency or emissions goals or guidelines such as jurisdictional or other regulatory requirements, for example. Fueling control unit 72, on the basis of the stored engine performance model, can output various control commands including a first fueling control command 94 to fuel admission valve 52, a second fueling control command 95 to admission valve 56, a spark-ignition command 96 to sparkplugs 68, and an AFR command 97 to AFR valve 22.

INDUSTRIAL APPLICABILITY

Figure 3:
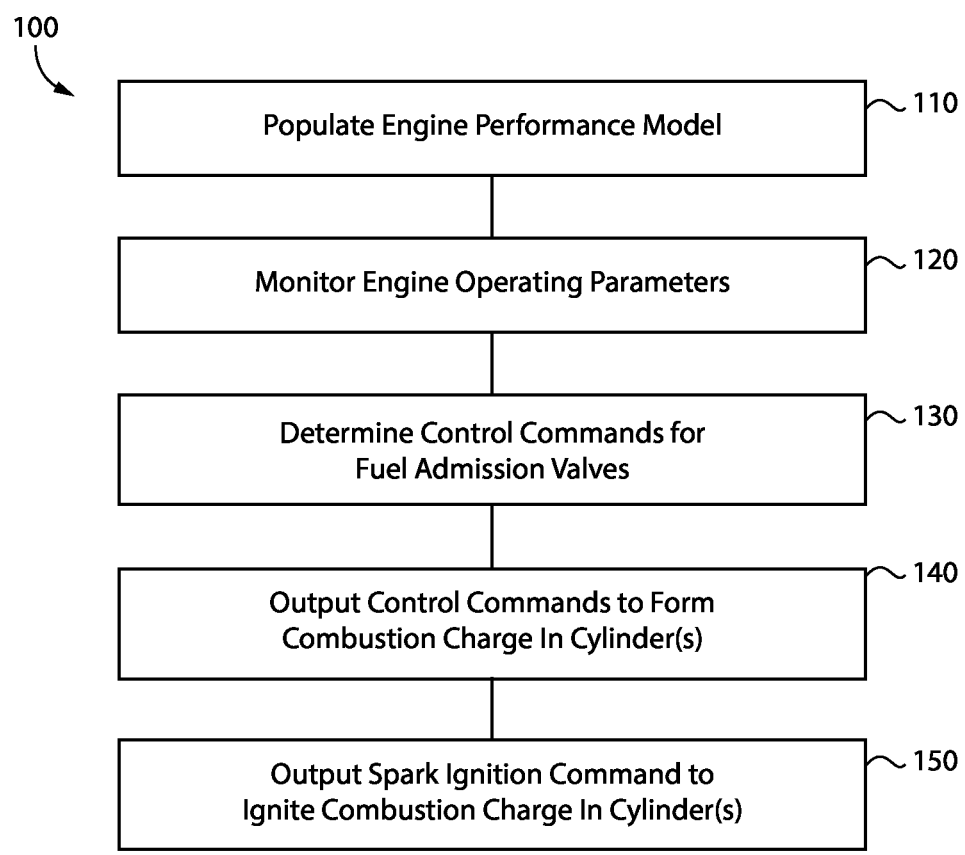
FIG. 3 is a flowchart illustrating example methodology and logic flow, according to one embodiment.

Referring to the drawings generally, but also now focusing on FIG. 3, there is shown a flowchart 100 illustrating example methodology and logic flow. At a block 110 the stored engine performance model is populated with the various engine operating parameters and potentially also a desired performance target. From block 110 flowchart 100 advances to a block 120 to monitor or continue monitoring the various engine operating parameters, and then to a block 130 to determine control commands for the fuel admission valves as discussed herein. Control commands for the fuel admission valves can include electrical current commands having, for example, a duration that determines an amount of gaseous fuel admitted. Block 130 can include calculations or lookups according to the stored engine performance model to establish desired amounts of fuel to be admitted.

From block 130 flowchart 100 advances to a block 140 to output the control commands to the fuel admission valves to form a combustion charge in the cylinder from the gaseous fuel blend, the additional H2, and pressurized air. From block 140 flowchart 100 advances to a block 150 to output a spark-ignition command to ignite a combustion charge in cylinders 16. It will be recalled a spark-timing parameter is one example of an in-cylinder combustion parameter. In parallel, previously, or subsequently, to block 150 fueling control unit 72 can output an AFR command to determine AFR, or another command to determine another in-cylinder combustion parameter. A spark timing command and an AFR command can thus be understood as in-cylinder control commands that cause combustion of a combustion charge according to in-cylinder combustion parameters determined on the basis of an engine performance model. The ignited combustion charge in cylinder 16 burns to drive pistons in cylinder 16 and rotate driveshaft 38.

As discussed herein a concentration of H2 in a gaseous fuel blend supplied to engine 12 can vary. In some instances, the gaseous fuel blend may include a varied H2 concentration relative to a prior H2 concentration. Fuel control system 70 can compensate for a difference between the varied H2 concentration and the prior H2 concentration relative to the performance target by way of the amount of the additional H2 that is admitted on the basis of the determined fueling control command to fuel admission valves 56. In this way, the present concepts can enable an operator to adjust the additional H2 amount up or down to operate a gaseous fuel engine system on as high a concentration of H2 as practicable whilst satisfying one or more engine performance targets.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating a gaseous fuel internal combustion engine system comprising:
   outputting a first control command to a first fuel admission valve to admit a gaseous fuel blend containing a gaseous hydrogen fuel (H2) from a first gaseous fuel supply into a gaseous fuel engine;
   outputting a second control command to a second fuel admission valve to admit additional H2 from a second gaseous fuel supply into the gaseous fuel engine;
   forming a combustion charge in a cylinder in the engine from the gaseous fuel blend, the additional H2, and air;
   determining, by way of the second control command, an amount of the additional H2 based on a performance target for an engine parameter varying on the basis of a relative amount of H2 in the combustion charge;
   burning the combustion charge in the cylinder; and
   compensating, relative to the performance target, for a varied H2 concentration in the gaseous fuel blend by way of the additional H2.

2. The method of claim 1 wherein the determining an amount of the additional H2 includes determining the amount via a stored engine performance model.

3. The method of claim 2 further comprising determining at least one in-cylinder combustion parameter via the stored engine performance model.

4. The method of claim 3 wherein:
   the at least one in-cylinder combustion parameter includes one or more of a spark timing parameter or an air-fuel ratio parameter; and
   the engine operating parameter includes an engine load parameter, an emissions parameter, an efficiency parameter, a temperature parameter, or an H2 concentration parameter.

5. The method of claim 1 wherein the gaseous fuel blend includes a gaseous hydrocarbon fuel (HC).

6. The method of claim 5 further comprising monitoring an H2 level in the second gaseous fuel supply, and wherein the determining the amount of the additional H2 includes determining the amount based on the monitored H2 level in the second gaseous fuel supply.

7. The method of claim 1 wherein the gaseous fuel blend includes a varied H2 concentration relative to a prior H2 concentration, and the compensating for a varied H2 concentration further includes compensating for a difference between the varied H2 concentration and the prior H2 concentration relative to at least one of an emissions performance target or a brake mean effective pressure (BMEP) performance target by way of the amount of the additional H2.

8. The method of claim 5 wherein the first fuel admission valve includes a fumigation admission valve.

9. The method of claim 8 wherein the second fuel admission valve includes one of a port injection admission valve or a direct injection admission valve.

10. The method of claim 9 wherein the first gaseous fuel supply includes a line gas supply, and the second gaseous fuel supply includes a pressurized H2 supply.

11. A gaseous fuel engine system comprising:
    a gaseous fuel engine having a cylinder formed therein;
    a conduit structured to convey a gaseous fuel blend containing a gaseous hydrogen fuel (H2) to the cylinder;
    a fuel system including a fuel admission valve, and a fueling control unit structured to:
    output a control command to the fuel admission valve to deliver additional H2 supplementing the H2 in the gaseous fuel blend;
    determine the control command to form within the cylinder a combustion charge of the gaseous fuel blend, the additional H2, and air, having a relative amount of H2 that is based on a performance target of an engine operating parameter that varies on the basis of a relative amount of H2 combusted in the cylinder;
    compensate, relative to the performance target, for a varied H2 concentration in the gaseous fuel blend by way of the additional H2; and
    operate the gaseous fuel engine in satisfaction of the performance target.

12. The engine system of claim 11 wherein the fuel admission valve includes one of a port injection admission valve or a direct injection admission valve.

13. The engine system of claim 12 wherein the conduit includes an intake conduit, and further comprising a compressor within the intake conduit, and a fumigation admission valve for the gaseous fuel blend coupled to the intake conduit at a location upstream of the compressor.

14. The engine system of claim 13 further comprising an H2 supply and a sensor structured to monitor an H2 level in the H2 supply, and wherein the fueling control unit is further structured to determine the control command based on the monitored H2 level.

15. The engine system of claim 11 wherein the engine operating parameter is one of an engine load parameter, an emissions parameter, an efficiency parameter, a temperature parameter, or an H2 concentration parameter.

16. The engine system of claim 11 wherein the fueling control unit is further structured to determine each of the control command and an in-cylinder combustion parameter via a stored engine performance model.

17. The engine system of claim 16 wherein the in-cylinder combustion parameter includes a spark timing parameter or an air-fuel ratio parameter.

18. A fuel control system for a gaseous fuel engine system comprising:
- a computer readable memory storing an engine performance model populated based on an engine operating parameter that varies on the basis of a relative amount of a gaseous hydrogen fuel (H2) combusted in a cylinder in a gaseous fuel engine;
- a fueling control unit coupled to the computer readable memory and structured to:
- output a control command to a fuel admission valve to deliver additional H2 supplementing H2 in a gaseous fuel blend conveyed into the cylinder;
- determine the control command by way of the engine performance model to form within the cylinder a combustion charge of the gaseous fuel blend, the additional H2, and air, having a relative amount of H2 that is based on a performance target of the engine operating parameter;
- adjust the additional H2 amount relative to a prior additional H2 amount by way of the control command; and
- operate the engine in satisfaction of the performance target based on the adjusted additional H2 amount.

19. The fuel control system of claim 18 further comprising a sensor structured to monitor an H2 level in an H2 supply, and wherein the fueling control unit is further structured to determine the control command based on the monitored H2 level.

20. The fuel control system of claim 18 wherein:
- the engine operating parameter is one of an engine load parameter, an emissions parameter, an efficiency parameter, a temperature parameter, or an H2 concentration parameter; and
- the fueling control unit is further structured to determine an in-cylinder combustion parameter via the stored engine performance model including a spark timing parameter or an air-fuel ratio parameter, and to output an in-cylinder control command to cause combustion of the combustion charge based on the determined in-cylinder combustion parameter.

* * * * *